United States Patent
Haeusler

(10) Patent No.: US 11,080,892 B2
(45) Date of Patent: Aug. 3, 2021

(54) COMPUTER-IMPLEMENTED METHODS AND SYSTEM FOR LOCALIZING AN OBJECT

(71) Applicant: The Boeing Company, Chicago, IL (US)

(72) Inventor: Phillip Haeusler, Melbourne (AU)

(73) Assignee: The Boeing Company, Chicago, IL (US)

( * ) Notice: Subject to any disclaimer, the term of this patent is extended or adjusted under 35 U.S.C. 154(b) by 130 days.

(21) Appl. No.: 16/594,359

(22) Filed: Oct. 7, 2019

(65) Prior Publication Data
US 2021/0104066 A1    Apr. 8, 2021

(51) Int. Cl.
G06T 7/73    (2017.01)
G06T 7/13    (2017.01)

(52) U.S. Cl.
CPC . G06T 7/75 (2017.01); G06T 7/13 (2017.01)

(58) Field of Classification Search
CPC .... G06T 7/13; G06T 7/75; G06T 7/12; G06T 7/251; G06T 7/70; G06T 7/174; G06T 7/80
See application file for complete search history.

(56) References Cited

U.S. PATENT DOCUMENTS

| | | | | |
|---|---|---|---|---|
| 2002/0191862 A1* | 12/2002 | Neumann | ................ | G06T 7/80 382/284 |
| 2010/0142826 A1* | 6/2010 | Kotake | ................ | G06T 7/75 382/203 |
| 2017/0032214 A1* | 2/2017 | Krenzer | ................ | G06T 7/77 |
| 2017/0221224 A1* | 8/2017 | Domae | ................ | G06T 7/74 |
| 2018/0293805 A1* | 10/2018 | Wang | ................ | G06T 7/73 |

OTHER PUBLICATIONS

Robust Registration of Virtual Objects for Industrial Applications (Year: 2004).*
Pixel-Wise Closed-Loop Registration in Video-Based Augmented Reality (Year: 2014).*
Real-Time Markerless Tracking for Augmented Reality: The Virtual Visual Servoing Framework (Year: 2006).*
Wikipedia, "Canny edge detector", Internet article accessed on Oct. 2, 2019 at: https://en.wikipedia.org/wiki/Canny_edge_detector, 8 pages.

* cited by examiner

*Primary Examiner* — Nizar N Sivji
(74) *Attorney, Agent, or Firm* — Sage Patent Group

(57) ABSTRACT

A method of localizing an object includes capturing a first image of the object from a first camera position, performing edge detection on the first image to form an edge-detected second image, and performing a distance transform on the second image to form a distance transformed third image. A virtual camera is positioned in virtual space relative to a virtual model of the object, and an edge-detected fourth image of the virtual model of the object is generated. An alignment cost is generated of the edge-detected fourth image of the virtual model relative to the edge-detected second image of the object, and a position of the virtual camera is transformed to a position having a lower alignment cost than the alignment cost. A physical location of the object is estimated based on the transformed virtual camera position.

20 Claims, 6 Drawing Sheets

COMPUTER-IMPLEMENTED METHODS AND SYSTEM FOR LOCALIZING AN OBJECT

FIELD

The present disclosure is related to three-dimensional simulation and rendering. In particular, the present disclosure relates to systems and methods for localizing an object using simulated three-dimensional rendering.

BACKGROUND

Object detection is a computer technology related to computer vision and image processing that deals with detecting instances of objects in digital images and videos. Object detection has applications in many areas of computer vision, and in particular can be applied in manufacturing environments to enable computerized manufacturing systems to detect objects, such as workpieces, tools, etc., in the manufacturing environment.

Object localization refers to the process of determining a physical location and/or orientation of a detected object within an environment. For example, in the manufacturing context, object localization may be employed to determine the physical position and orientation of a workpiece that is being acted upon by manufacturing equipment.

SUMMARY

A computer-implemented method of localizing an object includes capturing a first image of the object from a first camera position, performing edge detection on the first image to form an edge-detected second image, performing a distance transform on the second image to form a distance transformed third image, positioning a virtual camera at a virtual camera position in virtual space relative to a virtual model of the object, generating an edge-detected fourth image of the virtual model of the object based on the virtual camera position, generating an alignment cost of the edge-detected fourth image of the virtual model relative to the edge-detected second image of the object based on the distance transformed third image, transforming a position of the virtual camera from the virtual camera position to a transformed virtual camera position having a lower alignment cost than the alignment cost of the edge-detected fourth image, and estimating a physical location to the object based on the transformed virtual camera position.

In some embodiments, the method further includes repeating operations of transforming the position of the virtual camera, generating the edge-detected fourth image and generating the alignment cost of the edge-detected fourth image until the alignment cost of the edge-detected fourth image converges.

In some embodiments, a position of the virtual camera at which the alignment cost of the edge-detected fourth image converges corresponds to a local minimum of a gradient of the alignment cost of the edge-detected fourth image.

In some embodiments, generating the edge-detected fourth image of the virtual model of the object includes generating a virtual image of the virtual model from the virtual camera position and performing edge detection on the virtual image of the virtual model.

In some embodiments, performing edge detection on the first image includes applying a Canny filter to the first image.

In some embodiments, the Canny filter includes a first Canny filter, and performing edge detection on the virtual image of the virtual model includes applying a second Canny filter to the virtual image of the virtual model.

In some embodiments, the first Canny filter and the second Canny filter have different filter parameters.

In some embodiments, the first Canny filter and the second Canny filter use different edge detection thresholds.

In some embodiments, generating the edge-detected fourth image of the virtual model of the object includes generating a wireframe image of the virtual model from the virtual camera position, wherein the wireframe images only includes edges that are visible from the virtual camera position.

In some embodiments, the method further includes estimating a gradient of the alignment cost of the edge-detected fourth image of the virtual model relative to the edge-detected second image, wherein transforming the position of the virtual camera from the virtual camera position to the transformed virtual camera position is performed based on the estimated gradient.

In some embodiments, performing the distance transform includes, for each pixel in the edge-detected second image, assigning a brightness value to a corresponding pixel in the third image that is proportional to a distance from the pixel to a closest edge pixel in the edge-detected second image.

A computer-implemented method of localizing an object according to further embodiments includes capturing a first image of the object from a first camera position, performing edge detection on the first image to form an edge-detected second image, and performing a distance transform on the second image to form a distance transformed third image. Performing the distance transform includes, for each selected pixel in the edge-detected second image, assigning a brightness value to a corresponding pixel in the third image that is proportional to a distance from the selected pixel to a closest edge pixel in the edge-detected second image.

The method further includes positioning a virtual camera at a virtual camera position in virtual space relative to a virtual model of the object, and repeating operations of generating an edge-detected fourth image of the virtual model of the object based on the virtual camera position, generating an alignment cost of the edge-detected fourth image of the virtual model relative to the edge-detected second image of the object based on the distance transformed third image, and transforming a position of the virtual camera from the virtual camera position to a transformed virtual camera position having a lower alignment cost than the alignment cost of the edge-detected fourth image, until the alignment cost of the edge-detected fourth image relative to the edge-detected second image converges. A physical location of the object is estimated based on the transformed virtual camera position.

A system for localizing an object includes a processing circuit, and a memory circuit coupled to the processing circuit. The memory circuit includes computer-readable program instructions that, when executed by the processing circuit, cause the system to perform operations of receiving a first image of the object from a first camera position, performing edge detection on the first image to form an edge-detected second image, performing a distance transform on the second image to form a distance transformed third image, positioning a virtual camera at a virtual camera position in virtual space relative to a virtual model of the object, generating an edge-detected fourth image of the virtual model of the object based on the virtual camera position, generating an alignment cost of the edge-detected fourth image of the virtual model relative to the edge-detected second image of the object based on the distance transformed third image, transforming a position of the virtual camera from the virtual camera position to a transformed virtual camera position having a lower alignment cost than the alignment cost of the edge-detected fourth image, and determining a physical location of the object based on the transformed virtual camera position.

The features and functions can be achieved independently in various embodiments of the present disclosure or may be combined in yet other embodiments in which further details can be seen with reference to the following description and drawings.

BRIEF DESCRIPTION OF THE DRAWINGS

A series of drawings which aid in better understanding the disclosure and which are presented as non-limiting examples and are very briefly described below.

DETAILED DESCRIPTION

Embodiments of the present inventive concepts now will be described more fully hereinafter with reference to the accompanying drawings, in which embodiments of the inventive concepts are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

Systems/methods according to some embodiments perform localization of a physical object using simulated rendering of a three-dimensional model. In particular, some embodiments perform object localization by capturing a real image of the object from a known camera position and generating a simulated rendering of the object based on a three-dimensional model of the object rendered from a virtual camera position. The system/method localizes the object by aligning the real image of the object to the virtual image of the object as described in more detail below.

Figure 1:
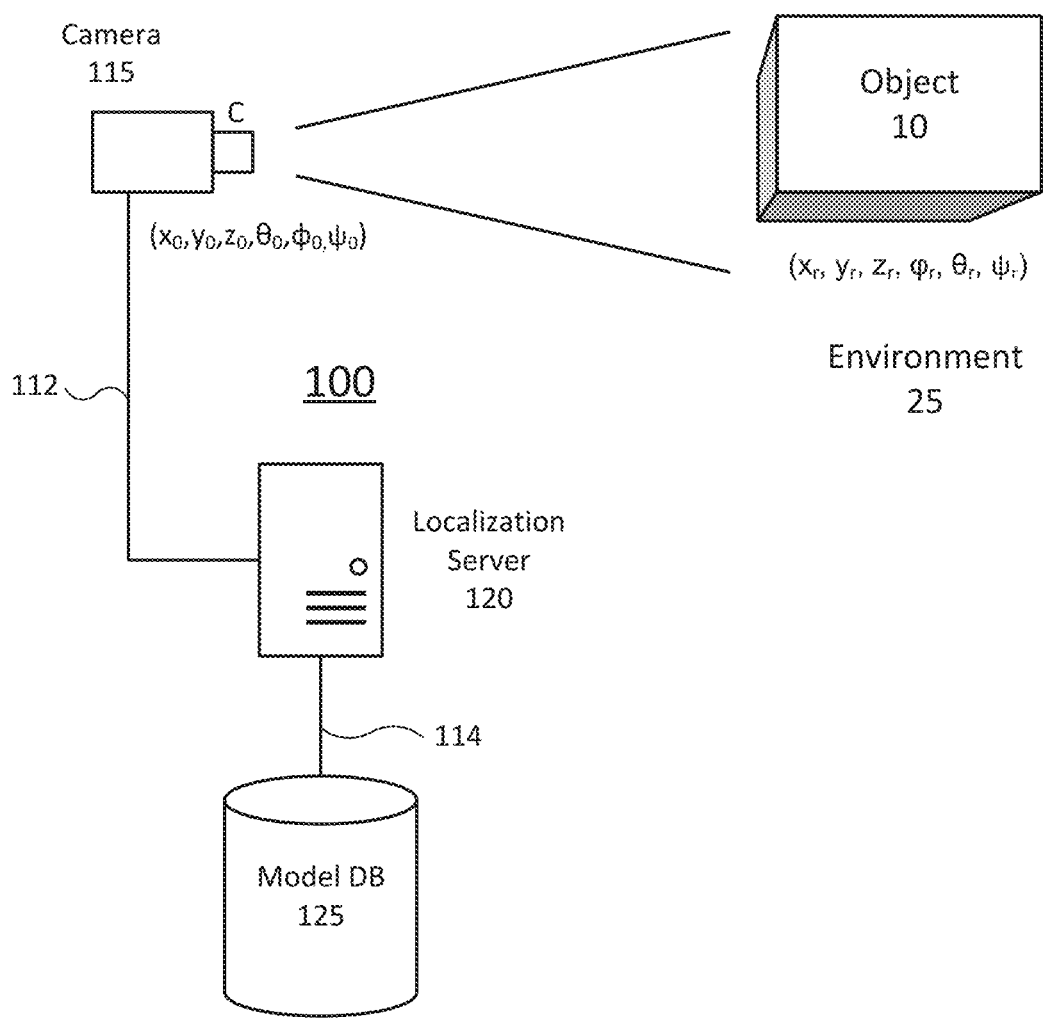
FIG. 1 schematically shows a block diagram of a system for localizing an object in an environment.

FIG. 1 schematically shows a block diagram of a localization system 100 for localizing an object in an environment. The localization system 100 includes a localization server 120, a camera 115 communicatively coupled to the localization server 120 via a wired or wireless communication link 112 and a model database 125 communicatively coupled to the localization server 120 via a wired or wireless communication link 114. The camera 115 is arranged to capture an image of an object 10 within an environment 25, such as a manufacturing environment or other environment. The camera is positioned at a camera position and orientation within or adjacent the environment 25. The position and orientation of the camera 115 may be characterized by a position vector $(x_0, y_0, z_0)$ and an orientation vector $(\varphi_0, \theta_0, \psi_0)$ including yaw $(\varphi_0)$, pitch $(\theta_0)$ and roll $(\psi_0)$. The position of the camera 115 within the environment 25 is known. The object 10 is located at an unknown position and orientation within the environment 25 represented by the tuple $(x_r, y_r, z_r, \varphi_r, \theta_r, \psi_r)$.

The model database 125 contains a three-dimensional model of the object 10 that may be accessed by the localization server 120. The localization server 120 may use the three-dimensional model of the object 10 to generate a simulated two-dimensional rendering of the object 10 from a virtual camera position, as described in more detail below.

Figure 2:
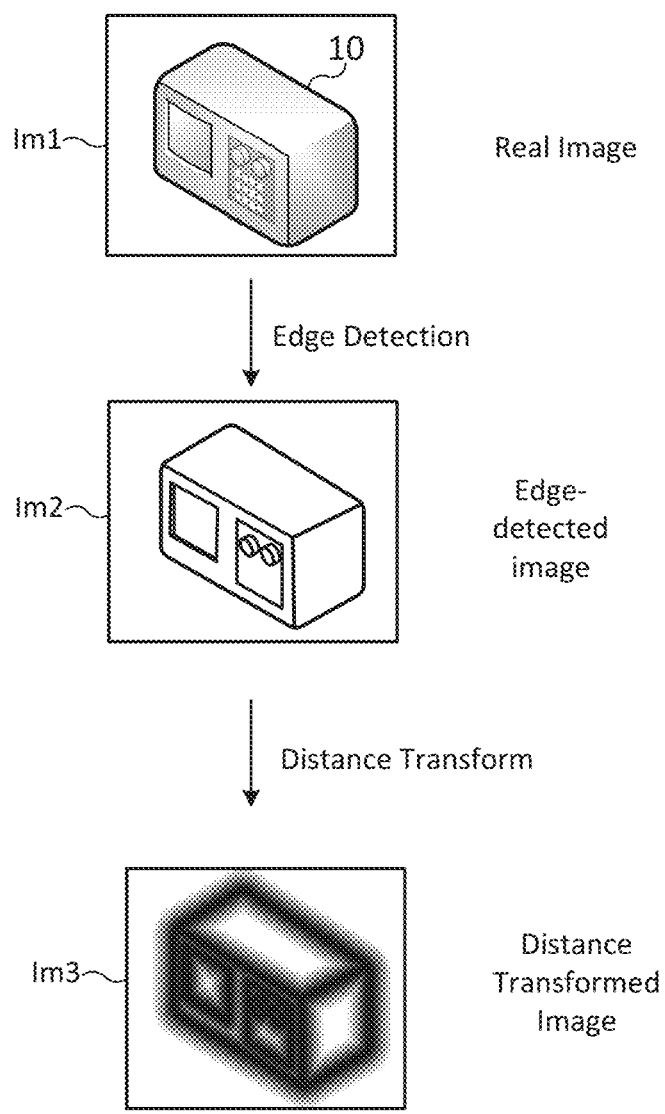
FIG. 2 illustrates initial and intermediate images of an object generated by systems/methods according to some embodiments.

FIG. 2 illustrates initial and intermediate images of an object generated by systems/methods according to some embodiments. Referring to FIG. 2, systems/methods according to some embodiments capture a real image (Im1) of an object 10 at an unknown position/orientation characterized by six degrees of freedom, namely xyz coordinates and roll/pitch/yaw coordinates represented by the tuple $(x_r, y_r, z_r, \varphi_r, \theta_r, \psi_r)$ relative to a camera 115 located at a known position/orientation $(x_0, y_0, z_0, \varphi_0, \theta_0, \psi_0)$. The systems/methods then perform edge detection on the image Im1 to obtain an edge-detected image Im2. Some embodiments perform edge detection on the real image Im1 using a Canny filter. As is known in the art, a Canny filter or Canny edge detector is an edge detection filter that uses a multi-stage algorithm to detect edges in images. Briefly, a Canny edge detection process includes five steps. First, a Gaussian filter is applied to the image to reduce noise. The method then finds the intensity gradients of the image. Next, the method applies non-maximum suppression to remove spurious responses to edge detection. The method then applies a double threshold to determine potential edges. Finally, the method suppresses weak edges that are not connected to strong edges.

A Canny filter has a number of parameters that can be adjusted to obtain a desirable edge-detected output image. For example, the size of the Gaussian filter is a parameter in the Canny filter. Similarly, in the double threshold step, high and low threshold values are selected.

Other types of edge detection techniques are known in the art and may be employed to generate the edge-detected image Im2.

After the edge-detected image Im2 has been generated, the systems/methods according to some embodiments then perform a distance transform on the edge-detected image Im2 to obtain a distance-transformed image Im3. A distance transform creates an image in which the value (or brightness) of each pixel corresponds to how far away it was from a pixel of cost in the input image. That is, the brightness of a pixel in the distance-transformed image Im3 corresponds to how far away the pixel is from the closest edge in the edge-detected image Im2. Thus, in the distance-transformed image Im3 shown in FIG. 2, a brighter pixel value indicates that the pixel is farther away from the closest edge.

Figure 3A:
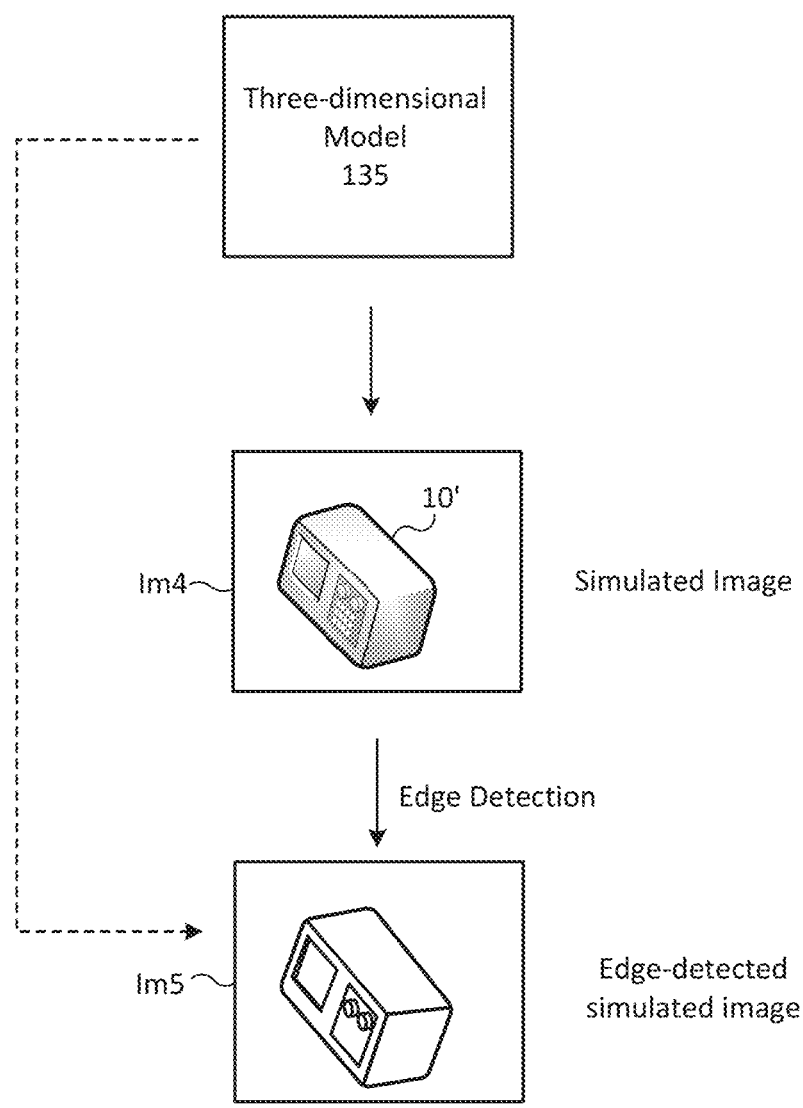
FIG. 3A illustrates intermediate images of an object generated as part of operations of systems/methods according to some embodiments.

Referring to FIG. 3A, a three-dimensional model 135 of the object 10 is obtained, for example, from the model database 125 (FIG. 1). According to some embodiments, a simulated two-dimensional rendering Im4 of a virtual object 10' corresponding to the object 10 is generated from an initial virtual camera position/orientation in virtual space using the data in the three-dimensional model 135. The rendering of 2D images from 3D models, which is well known in the art, involves projection of a 3D model onto a 2D plane, where the position and orientation of the 2D plane is determined based on the position/orientation of a virtual camera. In addition, the resolution, field of view, and aspect ratio of the virtual camera are selected to match those of the camera 115. Rendering may be performed, for example, using a tool such as Ogre3d.

Figure 3B:
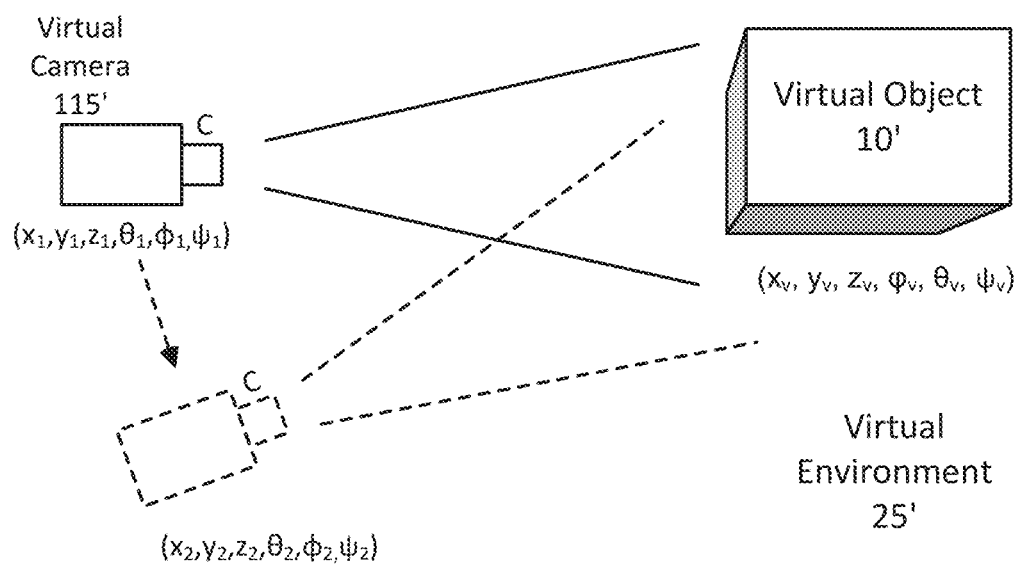
FIG. 3B illustrates the positioning of a virtual camera in a virtual environment according to some embodiments.

FIG. 3B illustrates the positioning of a virtual camera in a virtual environment according to some embodiments. As shown in FIG. 3B, a virtual camera 115' may be positioned at an initial position and orientation within a virtual environment 25' represented by the tuple $(x_1, y_1, z_1, \varphi_1, \theta_1, \psi_1)$. The virtual object 10' is located at a known position/orientation within the virtual environment 25' represented by the tuple $(x_v, y_v, z_v, \varphi_v, \theta_v, \psi_v)$.

The initial virtual camera position/orientation in virtual space may be selected based on an a priori expectation of the position/orientation of the camera 115 relative to the object 10 in the environment 25. That is, the initial position/orientation of the virtual camera in virtual space may be selected so that the virtual camera is positioned relative to the virtual object based on a "best guess" of how the camera 115 is positioned relative to the object 10. Such a priori knowledge may be obtained from prior localizations of similar objects within the environment 25.

Still referring to FIG. 3, once the simulated image Im4 has been generated, an edge detection process, such as a Canny edge detection process, may be performed on the simulated image Im4 to generate an edge-detected simulated image Im5. Other edge detection filters/algorithms are known in the art and may be used to generate the edge-detected simulated image Im5 from the simulated image Im4. Using Canny filters to generate both the edge-detected image Im2 and the edge-detected simulated image Im5 may improve the localization process, as they may generate edge-detected images having similar properties, such as edge thicknesses, edge strengths, etc. The filter parameters of the Canny filter used to generate the edge-detected image Im2 and the Canny filter used to generate the edge-detected simulated image Im5 may be different, however. The filter parameters for each filter may be selected/adjusted to make the properties of the edge-detected images as similar as possible.

In some embodiments, as shown by the broken line in FIG. 3, an edge detected simulated image Im5 may be generated directly from the three-dimensional model 135 by, for example, rendering only visible edges in the image. For example, the systems/methods may generate a wireframe image of the virtual model from the virtual camera position that only includes edges that are visible from the virtual camera position.

According to some embodiments, an image alignment cost is generated using the edge-detected simulated image Im5 and the distance transformed image Im3, and the position/orientation of the virtual camera is transformed based on a gradient of the image alignment cost to reduce the image alignment cost. For example, as shown in FIG. 3B, the position/orientation of the virtual camera 115' may be transformed (i.e., moved) from the first position/orientation within the virtual environment 25' represented by the tuple $(x_1, y_1, z_1, \varphi_1, \theta_1, \psi_1)$ to a second location within the virtual environment 25' represented by the tuple $(x_2, y_2, z_2, \varphi_2, \theta_2, \psi_2)$.

The process of generating the edge-detected simulated image Im5 and transforming the position/orientation of the virtual camera is repeated using nonlinear optimization until the image alignment cost converges. Once that occurs, the position/orientation of the virtual camera relative to the virtual object 10' is assumed to correspond to the position/orientation of the camera 115 relative to the object 10. Since the position/orientation of the camera 115 and the virtual camera are known, and the position of the virtual camera relative to the virtual object 10' is known, the position of the object 10 can be determined.

For example, to determine the alignment cost, the systems/methods analyze the edge-detected simulated image Im5. For each edge pixel in the edge-detected simulated image Im5, the systems/methods query the brightness value of the corresponding pixel in the distance-transformed image Im3. As noted above, in the distance-transformed image Im3, a brighter pixel value indicates that the pixel is farther away from the closest edge. Thus, edge pixels in the edge-detected simulated image Im5 that are closer to edges in the edge-transformed image Im2 will have a lower cost, and vice-versa. The brightness values of all pixels in the distance-transformed image Im3 corresponding to edge pixels in the edge-detected simulated image Im5 are summed, and the resulting sum is normalized by dividing by the total number of edge pixels. The resulting value provides a measure of alignment cost of the edge-detected simulated image Im5.

The systems/methods then estimate the gradient of the alignment cost function. Estimating the gradient of the alignment cost function may be performed using conventional non-linear optimization tools, such as Google Ceres, although other non-linear optimization tools may be used. The gradient of the cost function indicates the direction in virtual space along which the alignment cost will be reduced by moving the virtual camera position. Once the gradient of the cost function has been determined, the position of the virtual camera is transformed in the direction of the gradient, and the process of generating a simulated image Im4 of the virtual object 10', generating an edge-detected image Im5 from the simulated image Im4, and calculating an alignment cost for the edge-detected image Im5 based on the distance-transformed image Im3 is repeated until the alignment cost converges. In some embodiments, the alignment cost may be determined to converge when the alignment cost is less than a predetermined threshold. In other embodiments, the alignment cost may be determined to converge when the change in alignment cost from one iteration to the next is less than a predetermined threshold.

Figure 4A:
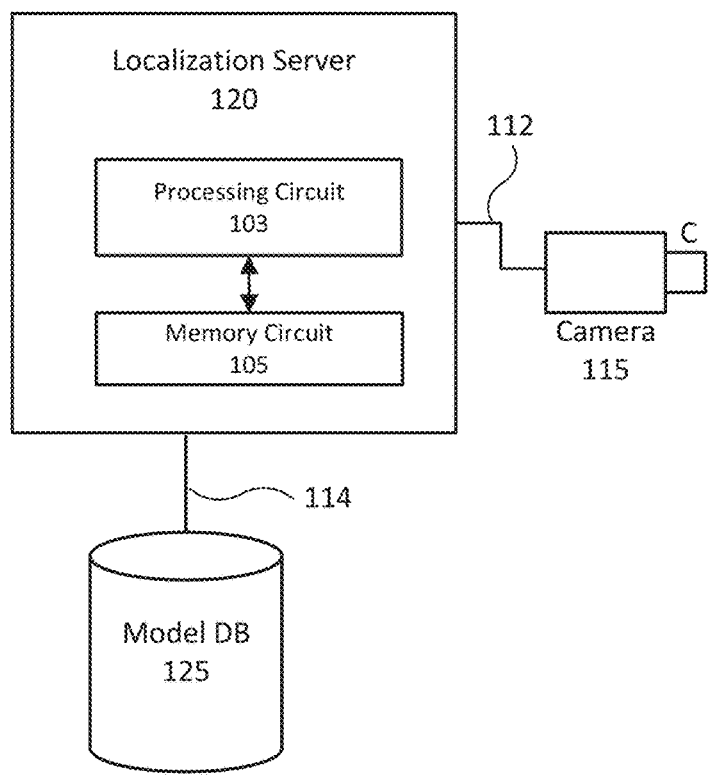
FIGS. 4A and 4B illustrates elements of a localization system according to some embodiments.
Figure 4B:
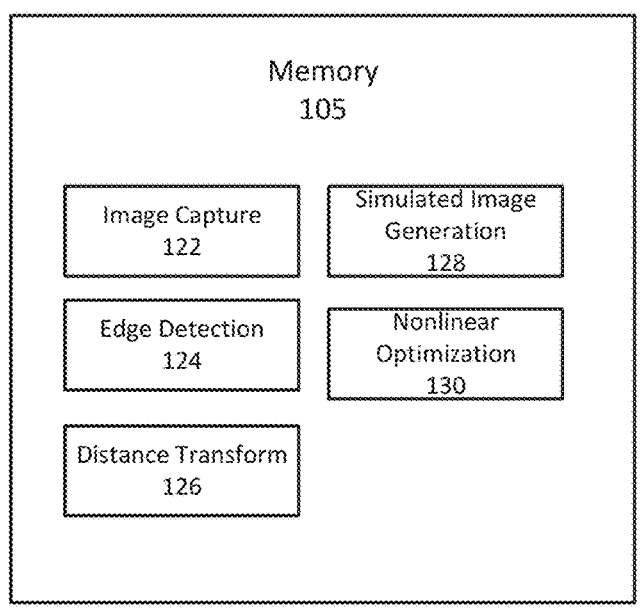

FIGS. 4A and 4B illustrates elements of a localization server 120 according to some embodiments. Referring to FIG. 4A, a localization server 120 includes a processing circuit 103 and a memory circuit 105 that stores computer readable program instructions that, when executed by the processing circuit 103 cause the processing circuit 103 to perform operations described herein. The localization server is connected to the camera 115 via a wired or wireless communication link 112 and a model database 125 communicatively coupled to the localization server 120 via a wired or wireless communication link 114.

FIG. 4B illustrates various functional modules that may be stored in the memory circuit 105 and executed by the processing circuit 103. As shown therein, the functional modules may include an image capture module 122 for capturing a real image Im1 of an object 10, an edge detection module 124 for generating an edge-detected image Im2 of the object 10, a distance transform module 126 for generating a distance-transformed image Im3 from the edge-detected image Im2 of the object 10, a simulated image generation module 128 for generating a simulated rendering Im4 of a virtual object 10' from a three dimensional model of the object 10, and a nonlinear optimization module 130 for aligning the simulated rendering and the real image.

Figure 5:
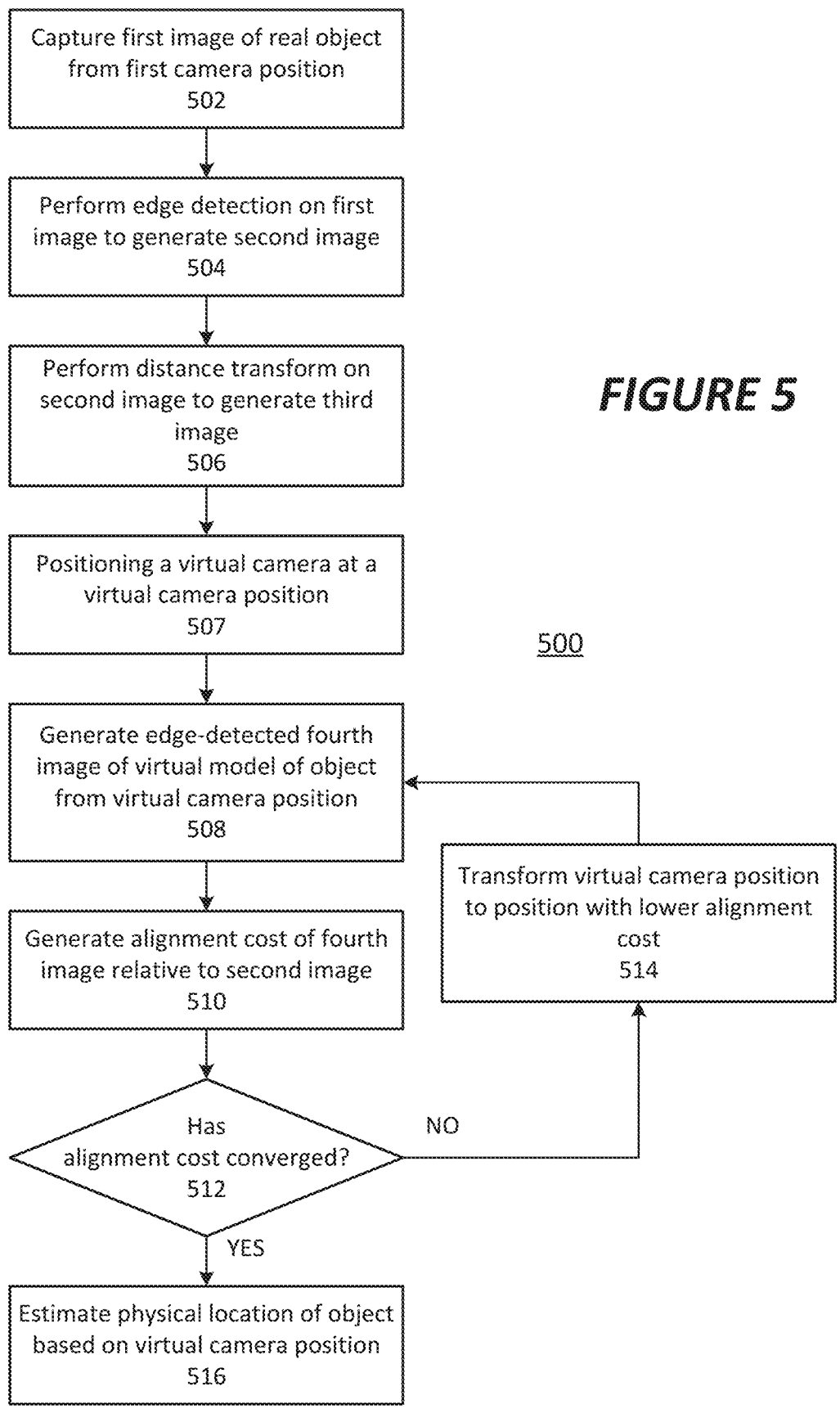
FIG. 5 is a flow chart that illustrates operations of systems/methods according to some embodiments.

FIG. 5 is a flow chart of a method 500 for performing object localization according to some embodiments. The method may be implemented as a computer-implemented method using the localization server 120 as described in reference to FIG. 4A.

Referring to FIG. 5, a computer-implemented method 500 of localizing an object includes capturing (block 502) a first image (Im1) of the object from a first camera position, performing (block 504) edge detection on the first image to form an edge-detected second image (Im2), and performing (block 506) a distance transform on the second image to form a distance transformed third image (Im3). A virtual camera is positioned (block 507) at a virtual camera position in virtual space relative to a virtual model of the object, and an edge-detected fourth image (Im4) is generated (block 508) of the virtual model of the object based on the virtual camera position by rendering the virtual model in two dimensions relative to the virtual camera position.

The method further generates (block 510) an alignment cost of the edge-detected fourth image of the virtual model relative to the edge-detected second image of the object based on the distance transformed third image.

The method then determines (block 512) if the alignment cost has converged. If not, the position of the virtual camera is transformed (block 514) from the virtual camera position to a transformed virtual camera position having a lower alignment cost than the alignment cost of the edge-detected fourth image by moving the virtual camera position along the gradient of the alignment cost function.

If it is determined at block 512 that the alignment cost has converged, the method estimates a physical location of the object based on the transformed virtual camera position (block 516).

The operations of transforming the position of the virtual camera (block 514), generating the edge-detected fourth image (block 508) and generating the alignment cost of the edge-detected fourth image (block 510) may be repeated until the alignment cost of the edge-detected fourth image converges. A position of the virtual camera at which the alignment cost of the edge-detected fourth image converges may correspond to a local minimum of a gradient of the alignment cost of the edge-detected fourth image.

The method may further include estimating a gradient of the alignment cost of the edge-detected fourth image of the virtual model relative to the edge-detected second image, and transforming the position of the virtual camera from the virtual camera position to the transformed virtual camera position may be performed based on the estimated gradient.

Performing the distance transform may include, for each pixel in the edge-detected second image, assigning a brightness value to a corresponding pixel in the third image that is equal to a distance from the pixel to a closest edge pixel in the edge-detected second image.

A computer-implemented method of localizing an object according to further embodiments includes capturing a first image of the object from a first camera position, performing edge detection on the first image to form an edge-detected second image, and performing a distance transform on the second image to form a distance transformed third image. Performing the distance transform includes, for each selected pixel in the edge-detected second image, assigning a brightness value to a corresponding pixel in the third image that is equal to a distance from the selected pixel to a closest edge pixel in the edge-detected second image.

The method further includes positioning a virtual camera at a virtual camera position in virtual space relative to a virtual model of the object, and repeating operations of generating an edge-detected fourth image of the virtual model of the object based on the virtual camera position, generating an alignment cost of the edge-detected fourth image of the virtual model relative to the edge-detected second image of the object based on the distance transformed third image, and transforming a position of the virtual camera from the virtual camera position to a transformed virtual camera position having a lower alignment cost than the alignment cost of the edge-detected fourth image, until the alignment cost of the edge-detected fourth image relative to the edge-detected second image converges. A physical location of the object is determined based on the transformed virtual camera position.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the inventive concepts and, although specific terms are employed, they are used in a generic and descriptive sense only and not for purposes of limitation, the scope of the inventive concepts being set forth in the following claims.

The invention claimed is:

1. A computer-implemented method of localizing an object, comprising:
    capturing a first image of the object from a first camera position;
    performing edge detection on the first image to form an edge-detected second image;
    performing a distance transform on the second image to form a distance transformed third image;
    positioning a virtual camera at a virtual camera position in virtual space relative to a virtual model of the object;
    generating an edge-detected fourth image of the virtual model of the object based on the virtual camera position;
    generating an alignment cost of the edge-detected fourth image of the virtual model relative to the edge-detected second image of the object based on the distance transformed third image;
    transforming a position of the virtual camera from the virtual camera position to a transformed virtual camera position having a lower alignment cost than the alignment cost of the edge-detected fourth image; and
    estimating a physical location of the object based on the transformed virtual camera position.

2. The method of claim 1, further comprising:
    repeating operations of transforming the position of the virtual camera, generating the edge-detected fourth image and generating the alignment cost of the edge-detected fourth image until the alignment cost of the edge-detected fourth image converges.

3. The method of claim 2, wherein a position of the virtual camera at which the alignment cost of the edge-detected fourth image converges corresponds to a local minimum of a gradient of the alignment cost of the edge-detected fourth image.

4. The method of claim 1, wherein generating the edge-detected fourth image of the virtual model of the object comprises:
generating a virtual image of the virtual model from the virtual camera position; and
performing edge detection on the virtual image of the virtual model.

5. The method of claim 4, wherein performing edge detection on the first image comprises applying a Canny filter to the first image.

6. The method of claim 5, wherein the Canny filter comprises a first Canny filter, and wherein performing edge detection on the virtual image of the virtual model comprises applying a second Canny filter to the virtual image of the virtual model.

7. The method of claim 6, wherein the first Canny filter and the second Canny filter have different filter parameters.

8. The method of claim 7, wherein the first Canny filter and the second Canny filter use different edge detection thresholds.

9. The method of claim 1, wherein generating the edge-detected fourth image of the virtual model of the object comprises:
generating a wireframe image of the virtual model from the virtual camera position, wherein the wireframe image only includes edges that are visible from the virtual camera position.

10. The method of claim 1, further comprising:
estimating a gradient of the alignment cost of the edge-detected fourth image of the virtual model relative to the edge-detected second image, wherein transforming the position of the virtual camera from the virtual camera position to the transformed virtual camera position is performed based on the estimated gradient.

11. The method of claim 1, wherein performing the distance transform comprises, for each selected pixel in the edge-detected second image, assigning a brightness value to a corresponding pixel in the third image that is equal to a distance from the selected pixel to a closest edge pixel in the edge-detected second image.

12. A computer-implemented method of localizing an object, comprising:
capturing a first image of the object from a first camera position;
performing edge detection on the first image to form an edge-detected second image;
performing a distance transform on the second image to form a distance transformed third image, wherein performing the distance transform comprises, for each non-edge pixel in the edge-detected second image, assigning a brightness value to a corresponding pixel in the third image that is equal to a distance from the non-edge pixel to a closest edge pixel in the edge-detected second image;
positioning a virtual camera at a virtual camera position in virtual space relative to a virtual model of the object;
repeating operations of:
generating an edge-detected fourth image of the virtual model of the object based on the virtual camera position;
generating an alignment cost of the edge-detected fourth image of the virtual model relative to the edge-detected second image of the object based on the distance transformed third image; and
transforming a position of the virtual camera from the virtual camera position to a transformed virtual camera position having a lower alignment cost than the alignment cost of the edge-detected fourth image;
until the alignment cost of the edge-detected fourth image relative to the edge-detected second image converges; and
estimating a physical location of the object based on the transformed virtual camera position.

13. A system localizing an object, comprising:
a processing circuit; and
a memory circuit coupled to the processing circuit, wherein the memory circuit comprises computer-readable program instructions that, when executed by the processing circuit, cause the system to perform operations of:
receiving a first image of the object from a first camera position;
performing edge detection on the first image to form an edge-detected second image;
performing a distance transform on the second image to form a distance transformed third image;
positioning a virtual camera at a virtual camera position in virtual space relative to a virtual model of the object;
generating an edge-detected fourth image of the virtual model of the object based on the virtual camera position;
generating an alignment cost of the edge-detected fourth image of the virtual model relative to the edge-detected second image of the object based on the distance transformed third image;
transforming a position of the virtual camera from the virtual camera position to a transformed virtual camera position having a lower alignment cost than the alignment cost of the edge-detected fourth image; and
determining a physical location of the object based on the transformed virtual camera position.

14. The system of claim 13, wherein the operations further comprise:
repeating operations of transforming the position of the virtual camera, generating the edge-detected fourth image and generating the alignment cost of the edge-detected fourth image until the alignment cost of the edge-detected fourth image converges.

15. The system of claim 14, wherein a position of the virtual camera at which the alignment cost of the edge-detected fourth image converges corresponds to a local minimum of a gradient of the alignment cost of the edge-detected fourth image.

16. The system of claim 13, wherein generating the edge-detected fourth image of the virtual model of the object comprises:
generating a virtual image of the virtual model from the virtual camera position; and
performing edge detection on the virtual image of the virtual model.

17. The system of claim 16, wherein performing edge detection on the first image comprises applying a Canny filter to the first image.

18. The system of claim 17, wherein the Canny filter comprises a first Canny filter, and wherein performing edge detection on the virtual image of the virtual model comprises applying a second Canny filter to the virtual image of the virtual model.

19. The system of claim 13, wherein the operations further comprise:
estimating a gradient of the alignment cost of the edge-detected fourth image of the virtual model relative to the edge-detected second image, wherein transforming the position of the virtual camera from the virtual camera position to the transformed virtual camera position is performed based on the estimated gradient.

20. The system of claim 13, wherein performing the distance transform comprises, for each selected pixel in the edge-detected second image, assigning a brightness value to a corresponding pixel in the third image that is equal to a distance from the selected pixel to a closest edge pixel in the edge-detected second image.

* * * * *